US009213958B2

(12) United States Patent
Atkinson

(10) Patent No.: US 9,213,958 B2
(45) Date of Patent: Dec. 15, 2015

(54) INTELLIGENT LABEL PROCESSING SYSTEM

(71) Applicant: Paul Atkinson, Poway, CA (US)

(72) Inventor: Paul Atkinson, Poway, CA (US)

(73) Assignee: Chromera, Inc., Poway, CA (US)

( * ) Notice: Subject to any disclaimer, the term of this patent is extended or adjusted under 35 U.S.C. 154(b) by 0 days.

(21) Appl. No.: 14/569,760

(22) Filed: Dec. 14, 2014

(65) Prior Publication Data

US 2015/0302349 A1 Oct. 22, 2015

Related U.S. Application Data

(63) Continuation-in-part of application No. 14/479,055, filed on Sep. 5, 2014.

(60) Provisional application No. 61/922,060, filed on Dec. 30, 2013, provisional application No. 61/955,235, filed on Mar. 19, 2014, provisional application No. 61/955,236, filed on Mar. 19, 2014, provisional application No. 61/955,237, filed on Mar. 19, 2014, provisional application No. 61/975,112, filed on Apr. 4, 2014, provisional application No. 62/025,043, filed on Jul. 16, 2014, provisional application No. 62/025,045, filed on Jul. 16, 2014.

(51) Int. Cl.
*G09F 3/02* (2006.01)
*G06Q 10/08* (2012.01)

(52) U.S. Cl.
CPC ........ *G06Q 10/0833* (2013.01); *G06Q 10/0832* (2013.01)

(58) Field of Classification Search
CPC ............. G04F 1/00; G06Q 30/02; G08B 5/00
USPC .............................................................. 40/5
See application file for complete search history.

(56) References Cited

U.S. PATENT DOCUMENTS

| | | | | | |
|---|---|---|---|---|---|
| 5,884,425 | A * | 3/1999 | Baldwin | ............... | G09F 3/0292 283/101 |
| 5,973,598 | A * | 10/1999 | Beigel | .................. | G06K 19/067 29/595 |
| 6,378,906 | B1 * | 4/2002 | Pennaz | ..................... | G09F 3/02 106/31.32 |
| 6,726,013 | B2 * | 4/2004 | Pennaz | .................... | G09F 3/02 206/459.1 |
| 7,347,378 | B2 * | 3/2008 | Frohlich | ................ | G06K 19/10 235/487 |
| 7,735,731 | B2 * | 6/2010 | Skaaksrud | ............. | G06Q 10/08 235/384 |
| 7,753,271 | B2 * | 7/2010 | Skaaksrud | ............. | G06Q 10/08 235/384 |
| 7,821,794 | B2 * | 10/2010 | Pennaz | ................... | G04F 13/04 361/760 |
| 7,913,382 | B2 * | 3/2011 | Heitzinger | ................ | G03F 7/40 29/832 |
| 8,229,801 | B2 * | 7/2012 | Eisenberg | ............ | G06Q 10/087 705/28 |
| 8,622,294 | B1 * | 1/2014 | Meyers | ................ | G06Q 10/083 235/375 |

(Continued)

*Primary Examiner* — Shin Kim

(57) ABSTRACT

Briefly, a new network processing system is provided that collects and coordinates key indicators regarding a product's quality as that product moves from supplier to end user. By doing so, the processing system provides robust, authentic, and trustworthy data that (1) reports the time period when any custodian had the product, (2) identifies what timing or environmental condition caused the product to go bad, and (3) verifies which custodian acted to make the product defective. In use, an intelligent label is attached to a product, and the intelligent label has a timer as well as one or more sensors for monitoring environmental conditions. Upon exceeding timing or environmental rules, a visual alarm indicator is activated on the label. Since the label has electronically retrievable data, electronically scanable data, and human readable date, the network process can collected key data regarding the product along the entire distribution chain.

20 Claims, 8 Drawing Sheets

(56) References Cited

U.S. PATENT DOCUMENTS

| | | | | |
|---|---|---|---|---|
| 8,836,533 B2* | 9/2014 | Timm | | G04F 1/005 340/539.1 |
| 8,949,325 B1* | 2/2015 | Hernacki | | G06F 3/12 709/204 |
| 9,092,814 B2* | 7/2015 | Timm | | G04F 1/005 1/1 |
| 2005/0178843 A1* | 8/2005 | Frohlich | | G06K 19/10 235/487 |
| 2006/0227523 A1* | 10/2006 | Pennaz | | H01M 6/40 361/783 |
| 2006/0261164 A1* | 11/2006 | Bochicchio | | G01G 19/083 235/385 |
| 2007/0017136 A1* | 1/2007 | Mosher | | A61B 5/117 40/633 |
| 2008/0169343 A1* | 7/2008 | Skaaksrud | | G06Q 10/08 235/376 |
| 2008/0172303 A1* | 7/2008 | Skaaksrud | | G06Q 10/08 235/384 |
| 2008/0203166 A1* | 8/2008 | Skaaksrud | | G06Q 10/08 235/462.1 |
| 2009/0024584 A1* | 1/2009 | Dharap | | G06F 15/177 1/1 |
| 2009/0164293 A1* | 6/2009 | Coley | | G06Q 10/06311 705/7.13 |
| 2011/0096388 A1* | 4/2011 | Agrawal | | G02F 1/1506 359/268 |
| 2011/0122120 A1* | 5/2011 | Feuilloley | | G06K 19/04 345/211 |
| 2011/0277361 A1* | 11/2011 | Nichol | | G02B 6/0018 40/541 |
| 2015/0187234 A1* | 7/2015 | Atkinson | | G09F 3/0297 40/5 |

* cited by examiner

500

Message Generation and Verification

Intelligent Label=1...n
Secret Key=SK ; 1 per Intelligent label
Condition=1...n
Time=1...n

Generation
   Encrypt($Sk_i$, $condition_j$ || $time_k$)=> $message_{i,j,k}$

Verification
   Decrypt($Sk_i$, $message_{i,j,k}$)=> $condition_j$ || $time_k$

FIG. 5

INTELLIGENT LABEL PROCESSING SYSTEM

RELATED APPLICATIONS

This application claims priority to U.S. application Ser. No. 14/551,600, filed Nov. 24, 2014, which claims priority to and is a continuation in part to U.S. patent application Ser. No. 14/479,055, entitled "An Intelligent Label Device and Method," which claims priority to and is a continuation in part to U.S. patent application Ser. No. 13/002,275, entitled "Flexible and Printable Electro-optic Devices," filed on Dec. 30, 2010, which claims priority to provisional application Ser. No. 61/078,328, filed on Jul. 3, 2008; provisional application Ser. No. 61/087,796, filed Aug. 11, 2008; provisional application Ser. No. 61/109,691 filed on Oct. 30, 2008; provisional application Ser. No. 61/156,932 filed on Mar. 3, 2009, provisional application Ser. No. 61/168,421 filed on Apr. 10, 2009 and provisional application Ser. No. 61/187,619 filed Jun. 16, 2009, which applications are incorporated by reference herein. This application also claims priority to provisional application Ser. No. 61/922,060, filed Dec. 30, 2013; provisional application Ser. No. 61/955,235, filed Mar. 19, 2014; provisional application Ser. No. 61/955,236, filed Mar. 19, 2014; provisional application Ser. No. 61/955,237, Mar. 19, 2014; provisional application Ser. No. 61/975,112, filed Apr. 4, 2014; provisional application Ser. No. 62/025,043, filed Jul. 16, 2014; and provisional application Ser. No. 62/025,045, filed Jul. 16, 2014; each of which is incorporated herein as if set forth in their entirety.

FIELD OF THE INVENTION

The present invention relates to a network computer support system that collects, synchronizes, and uses data regarding the transfer of a good from a ship point to a delivery point. In one aspect the network collects data from an intelligent label that is particularly constructed to be associated with a good, and which provides trusted and verifiable reporting of changes in conditions that reflect those of the good. The system is used to manage and authenticate events associated with time and environmental conditions that are detected by an intelligent label.

BACKGROUND

Modern commerce is increasingly dependent on transporting goods using carriers as society embraces more and more online shopping. For example, modern consumers are increasingly using online shopping and common carriers for delivering wine, prescription medication, food, and sensitive electronic devices. To assist in tracking and monitoring the movement of sensitive and expensive goods, labels have been developed in the past that incorporate RFID communication and intelligence. In this way, at the point of shipment and throughout the major carriers, the good has the ability to be tracked. However, adoption of such RFID labels has been slow, as the equipment for initializing, loading, updating, and interrogating the label's RFID electronics is expensive, and typically only available at larger transfer points in the shipping transaction. Further, it is unlikely, and even rare, for the end consumer to be able to interact with the label. Since the consumer is a critical part of the delivery chain, and the consumer is excluded from participation in the information available on the label, the use of intelligent labels has been quite low and very ineffective in improving the customer experience.

A particularly difficult problem occurs when a product is shipped from the supplier to a consumer, and the consumer reports that the product is defective. For example, the consumer may complain that a screen on an electronic device is broken, which strongly suggests that its shipping package was subjected to a shock trauma. When the supplier receives a call from the consumer, the supplier has very limited information as to when the device was damage, how the device was damaged, or who had custody of the device when it was damaged. In one scenario, the consumer may have received a perfectly functioning device, and in the first few days of use dropped the device on the sidewalk. Even though the cause of the defect was the consumer, the consumer may be able to get a free replacement device because the supplier has no information to understand what really happened.

SUMMARY OF THE INVENTION

The new network processing system collects and coordinates key indicators regarding a good's condition or quality as that good moves from a supplier to an end user. It will be understood that the supplier may be the manufacturer of the product, or it may be a retailer or distributor or the product. It will also be understood that the terms "good" and "product" may be used interchangeably herein. By collecting more complete information regarding the good and its delivery path, the processing system provides robust, authentic, and trustworthy data that (1) reports the time and/or the time period when third parties, e.g. distributors, resellers and shippers, had custody of the good, (2) identifies what timing or environmental condition caused changes in the condition of the good, and (3) verifies which party had possession of the good when the changes occurred. In use, an intelligent label is attached to a good, and the intelligent label has a timer or real-time clock and/or one or more sensors for monitoring environmental conditions. Upon exceeding timing or environmental rules, a visual indicator is activated on the label. The label further has electronically retrievable data, scanable data, and human readable data, which enables the network process to collect key data regarding the good along the entire distribution chain.

In operation, an intelligent label is associated with a good, and includes one or more bi-stable, and preferably permanent and irreversible electro-optic or electrochromic indicators that are used to report the condition of that good at selected points in the movement or usage of that good. These electro-optic or electrochromic indicators provide immediate visual information regarding the status of the good without need to interrogate or communicate with the electronics or processor on the intelligent label. In this way, anyone in the shipping or use chain for the good, including the end user consumer, can quickly understand the condition of the goods (e.g. ascertain whether the good is meeting shipping and quality standards, and to what extent). If the condition of the good warrants an action (e.g. the condition has degraded and fails to meet shipping or quality standards) the particular time and custodian of the good, when the condition of the good changed to the extent that action is warranted can be quickly and easily identified, and information can be used to enable the appropriate action to be taken (e.g. the goods are not used or consumed, the goods are properly dispose or replaced, a return authorization or credit is issued etc.) In many cases the appropriate action requires that this information is made available to one or more parties and its veracity appropriately verifiable to enable its use to drive business rules and respond to the change(s) in conditions as appropriate to the circumstances (e.g. the good, the change in conditions, the buyer, seller etc.)

BRIEF DESCRIPTION OF DRAWINGS

These and other objects and advantages of the invention will become apparent upon reading the following detailed description and upon referring to the drawings in which:

FIG. 5 is a block diagram of the process for event processing in accordance with the present invention.

Figure 1:
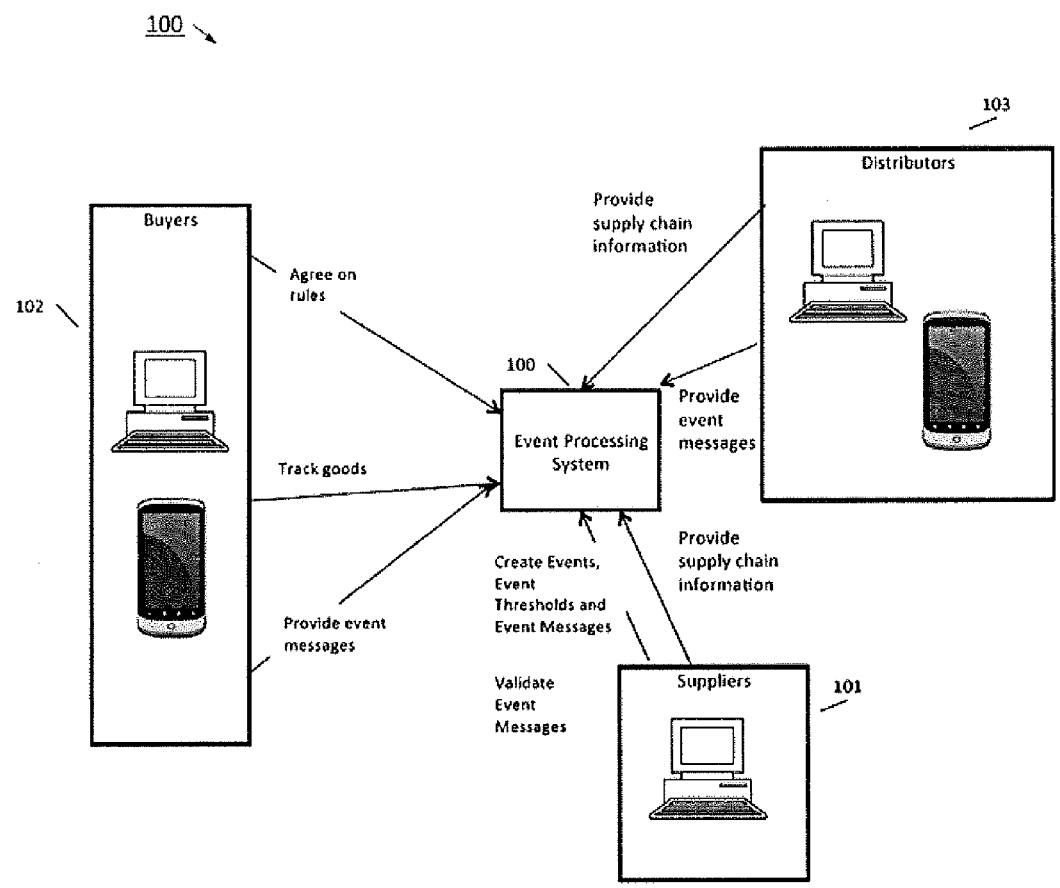
FIG. 1 is a block diagram of the network system and participants in accordance with the present invention.

While the invention will be described in conjunction with example embodiments, it will be understood that it is not intended to limit the invention to such embodiments. On the contrary, it is intended to cover all alternatives, modifications and equivalents as may be included within the spirit and scope of the invention.

DETAILED DESCRIPTION

The following description of exemplary embodiments of the invention is not intended to limit the scope of the invention to these exemplary embodiments, but rather to enable any person skilled in the art to make and use the invention.

An intelligent label is associated with a good, and includes one or more permanent and irreversible electrochromic indicators that are used to report the condition of that good at selected times and points in the movement or usage of that good. These electrochromic indicators provide immediate visual information regarding the status or condition of the good without need to interrogate or communicate with the electronics or processor on the intelligent label. In this way, anyone in the shipping or use chain for the good, including the end user consumer, can quickly ascertain the condition or state of the good and related time and environmental data that enables the appropriate parties to act or effect on one or more transactions accordingly.

For the information derived from the electrochromic indicators to be of value in improving the distribution of goods or in responding to a customer complaint, the information must be available and verifiable by the parties who must take action. For example, a pharmaceutical package shipped from a manufacturer directly to a consumer may be out of specification when it is delivered if the package has been exposed to a temperature higher than a certain threshold during transit. If this were the case, the simplest action for the consumer and for the supplier might be to immediately distribute a new pharmaceutical package to the consumer and for the consumer to dispose of the original package (and pharmaceuticals). However, there are risks in this situation. A consumer may indicate to the pharmaceutical supplier that this condition existed when it did not, and further that they disposed of the original package and pharmaceuticals when they did not.

As a result the consumer would receive two products for the price of one, and importantly the consumer may be tempted to consume dangerous levels of the pharmaceutical or distribute it illicitly without anyone being the wiser.

To avoid these risks the pharmaceutical supplier needs to be able to verify that the original pharmaceuticals are indeed out of specification and also that they are disposed of properly. In addition, the pharmaceutical supplier would like to be able to verifiably determine when the out-of-temperature event occurred and which party had custody of the goods when it happened and for how long, as there may have been multiple potential parties involved in the distribution chain and the financial and remedial responsibility for this out-of-specification condition may belong to only one of the parties (including the consumer). This, and other electronically and optically accessible data from the label, also facilitates efficient and effective procedures for returning the out of specification pharmaceuticals (e.g. via return shipment or to a nearby bricks-and-mortar location) and effecting the appropriate settlement between the involved parties. The Intelligent Label Processing System establishes a robust mechanism for data collection and verification by interested parties in the process.

The current custodian of the good is able to use the intelligent label to direct processes, which may in some cases be the consumer, and in others may be a shipper or other third party. For example, an intelligent label that has a red visual indicator can direct a party that the associated good take an exceptional process path while all others are processed normally. The local custodian can communicate the status of the good and the existence of exception events by a variety of means. In one instantiation, the custodian takes a photo of the label including the visual indicator with a mobile phone camera and transmits it to other parities in the supply chain.

All parties in the supply chain, both local and remote, can use these visual indicators to validate events and to build business rules based around the events' occurrence. In this regard, it is important that the indicators are bi-stable and preferably permanent and irreversible in order that all parties in the supply chain are able to authenticate the event. Having a persistent visual indicator is desirable as it reduces or avoids accidental and intentional modification, enables verification after the event. It will be understood that the time period for the persistence of the visual indicator can be selected based on the value and type of good. For example, a carton of milk may only need a visual indicator that persists for a few weeks, whereas an electronic device may need much longer persistence, and possibly even permanent. These visual indicators can be coupled with other private data that are electronically accessible to a party in possession of the intelligent label through, for example, RFID protocols. In addition, these visual indicators can be coupled with other public information that is printed on the label or the good, such as a serial number, customer identification number, sales order number or ship time/date. Any of these data items can be made available to other parties in the supply chain prior to or during the distribution process. These data can support further levels of authentication and provide additional contextual information about the event. Secure and robust processes can be built that depend on the coupling of this visual information data items on the label (including some unknown and inaccessible by the local custodian) and traditional supply chain transaction information.

The establishment of a verifiable chronology for a good is key in the development of these processes. The intelligent label can be used to establish a timeframe for events and changes of custody of interest surrounding a good. The patent application Ser. No. 14/479,055, entitled "An Intelligent Label Device and Method," claims methods for the establishment of a start time for measurement. Events that are tracked by the intelligent label beyond this point can be made with respect to that point in time. In some cases this time can be synchronized with absolute time, but in many cases this synchronization is not required.

FIG. 1 provides an overview diagram of the key participants in a network processing system illustrated as an Event Processing System (EPS) 100. Supplier 101 interacts with EPS 100 by creating events, event rules, event messages for goods tracked by EPS 100. In some cases, event rules and event messages may also be defined by buyer 102 and distributor 103. In one example, supplier 101 can provide a set of event rules that define events in terms of specific values and/or thresholds for time or environmental conditions affecting their goods. For example, the supplier may establish a maximum period of time a good is in transit from the supplier to end-user, the minimum temperature to which the good is exposed or the limits for the vibration the good is subjected to. If the thresholds of time or environmental condition(s) are exceeded, the intelligent label will cause an event message to be displayed on the face of the label and may electronically record the event (e.g. the time the threshold was exceeded and the actual values at that time) within the label itself, as well as. It will be understood that events may be defined in terms of incremental changes in conditions (e.g. progressive increases or decreases in temperature associated with corresponding changes in the effectiveness, quality, value etc. of a good).

Event messages may comprise one or more simple visual alarm indicators and/or visual elements configured in more complex configurations and structured in ways that can build textual or numeric information, for example, such as using a segment or dot-based character construction that shows on the label surface. Event messages may further comprise visual information previously disposed (e.g. printed) on the label some of which may be associated with event messages generated by the label. Supplier 101 validates event messages by implementing and controlling a set of keys used to authenticate event messages to and from the label. In this way, the supplier can be confident that information and event messages received from distributors, resellers, shippers and buyers relates to a particular good and events that occurred in the associated label.

As the good moves through the distribution chain, it will likely pass through the custody one or more distributors, sellers and shippers (collectively "distributors"). Distributors are able to extract data from the label coupled to the good, by interrogating the label electronically, scanning the label optically, or visually inspecting the label, and transmit the data to EPS 100. Buyers/end-user consumers will similarly be able to extract data from the label and transmit it to EPS 100. In this way, EPS 100 is provided with accurate timing, event and custodial information. Independent of buyer 102, distributor 103 interacts with EPS 100 by providing event messages (if any) and supply chain information about goods tracked by EPS 100.

Supplier 101, buyer 102 and distributors 103 may provide transaction rules to EPS 100. Transaction rules specify the action to be taken, or transaction(s) to be executed by EPS 100 in response to event messages received from buyers. For example, transaction rules may include authorizing returns, shipping replacement goods, issuing refunds, credits (or debits), discounts etc. in response to event messages. In response to event messages and information from distributors transaction rules may include billing (or crediting) distributors. In response to event messages, information received from distributors, customer information (e.g. buying history, incidences of problems, credit and other risks, weather etc., various interested parties (e.g. manufacturers, service providers, insurers etc.) may be notified and economic or other adjustments and actions taken. Transaction rules may be executed electronically and with human interaction appropriate to the specific circumstances. Importantly, EPS 100 provides robust, authenticable, and accurate information to the supplier such that the supplier can make well informed and better decisions on how to respond to consumer issues.

Figure 2:
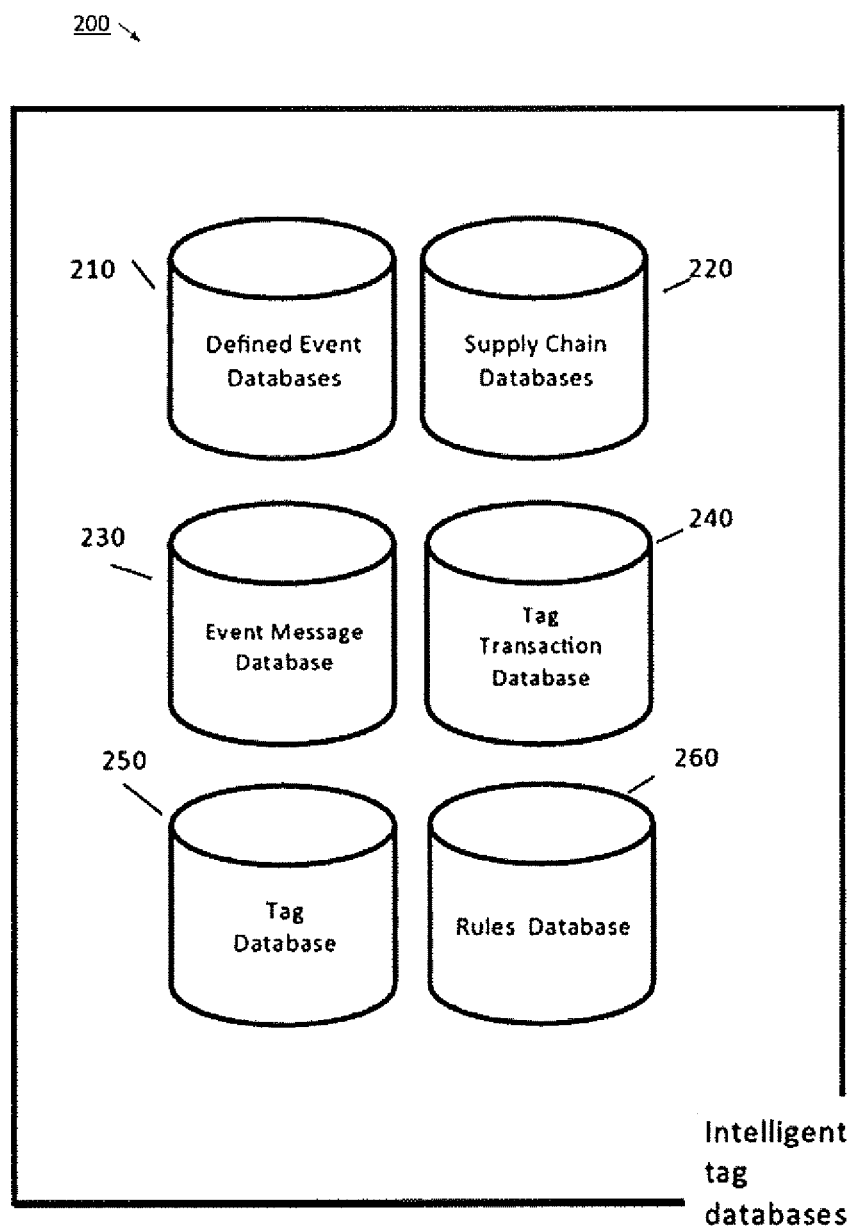
FIG. 2 is a block diagram of an authenticated event processing system in accordance with the present invention.

FIG. 2 provides an overview diagram of one possible arrangement for databases used in the operation of EPS 100. It will be understood that several alternatives exist to one skilled in the art. Defined Event Database 210 contains information about the events tracked by EPS 100. Event Message Database 230 contains event messages that have been associated with events defined in defined event database 210.

Event messages comprise in part information presented on bi-stable electro-optic indicators or other human-readable display on the face of an intelligent label. Preferably, the indicators are irreversible and permanent in addition to being bi-stable such as the electrochromic indicators described in patent application Ser. No. 14/479,055. It is also preferable that it can be electronically determined with confidence whether an event message has been (or is) electronically displayed by confirming the state of the electro-optical material.

Event messages may be the same for multiple intelligent labels or be unique for a given intelligent label. In one example, a bit string can represent a message. An intelligent label displays an event message when a pre-specified and defined event has been detected. Event messages are designed to be captured by buyer 102 or distributor 103 and supplied to EPS 100, where supplier 101 can validate the messages and events. Supply Chain Database 220 contains information about the movement and exchange of goods monitored by EPS 100. This information is used by EPS 100 to determine custody of a good when an event occurs. Label Transaction Database 240 contains information about the occurrence of events associated with individual intelligent labels. Label Database 250 contains information about individual intelligent labels, such as label serial numbers. Label serial numbers can then be used to index information in the other database. Rules Database 260 contains information about the transaction rules that have been agreed by the parties participating in EPS 100. For example, a good may remain in an acceptable quality state if exposed to a temperature for only a short period of time, but would be considered out of specification if the temperature remained for more than a set period of time. It will be appreciated that a wide variety of rules may be associated with an intelligent label. This out of specification condition can itself be associated with a business rule. It may, for example, result in the automatic reshipment of goods or a reduction in the price for goods charged by supplier 101 to buyer 102.

Figure 3:
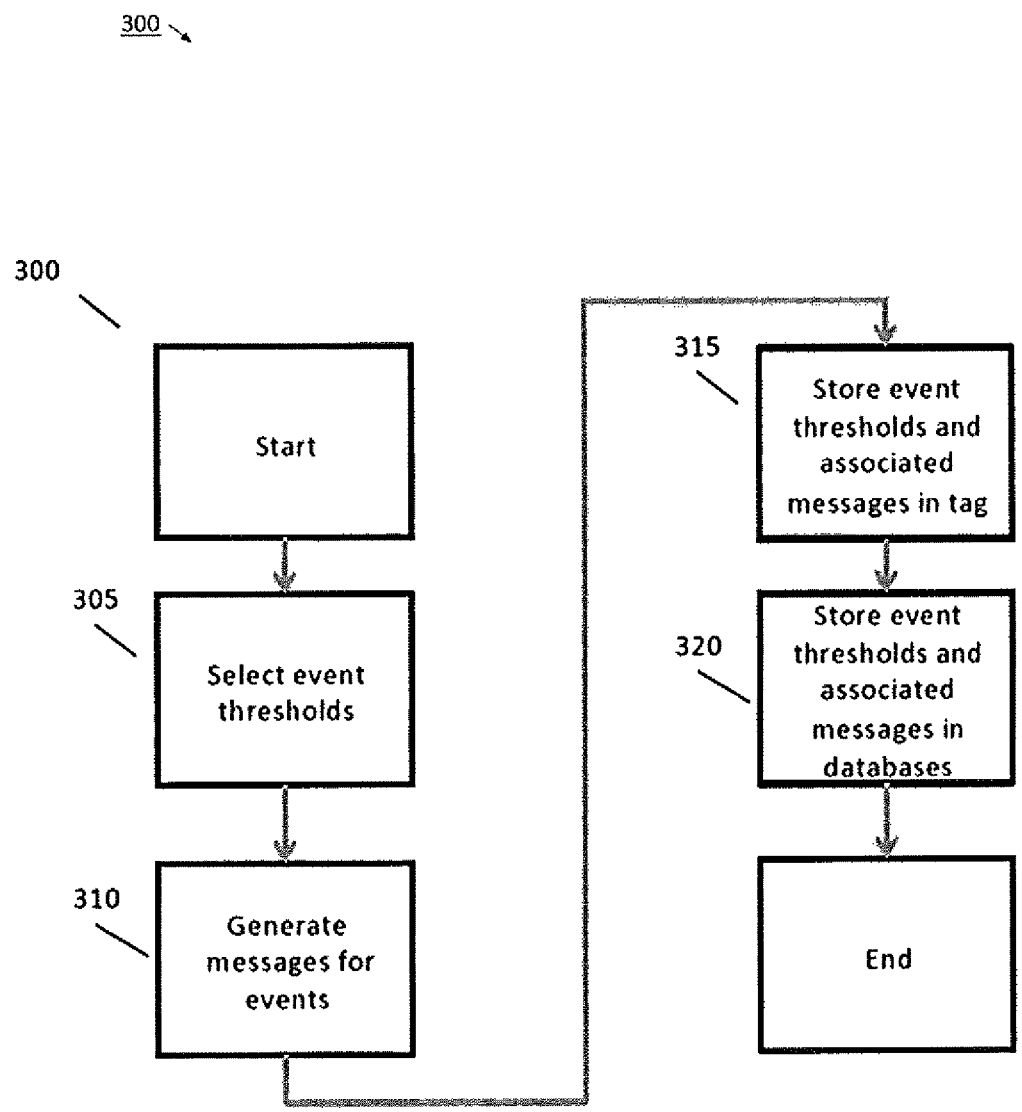
FIG. 3 is a block diagram of the databases used in the operation of an exemplary version of the present invention.

When supplier 101 desires to distribute a good using the intelligent label and the network process, the supplier engages in process 300, a diagram of which is provided in FIG. 3. Process 300 begins in process step 305 in which the supplier selects event rules for a given intelligent label or set of labels. Event rules can be established for different goods, different supply chains, and different pairs of suppliers and buyers. These event rules are then stored in Defined Event Database 210. Process 300 then proceeds to process step 310, where event messages are associated with events. It will be understood that there are many different types of events and event messages that may be defined.

Event Messages are typically generated in a process that provides a level of protection that is appropriate for the value of a given good or the risk of it being out of specification. For example, an inexpensive good may have event messages that are simple indications that an event occurred. A more expensive good may have messages that have been generated to have a level of security that ensures it would be difficult for a buyer 102 or distributor 103 to counterfeit it or tamper with the display of the event message. Methods of protection include selection of an event message from a sufficiently large message space that it would be appropriately difficult to be guessed by a Buyer 102 or Distributor 103. This event message can include an internal code that is uniquely associated with the serial number of the intelligent label. Alternatively, a private or public cryptographic function that makes uses the serial number of the intelligent label or some other unique piece of information about the label to transform the event message can be used. An overview of the process for event message generation and verification using a private cryptographic process is provided in FIG. 5, discussed below.

Process 300 then proceeds to process step 315 where the event rules and event messages generated in the previous steps are stored on the intelligent label. The label will have a lookup table from which to determine event rules. It will either have a lookup table or an embedded function that it will use to generate the appropriate event message associated with an event. It will be understood that other types of transactional functions may be supported depending upon the application's specific needs. Process 300 continues to process step 320. In process step 320 the event rules and their associated event messages respectively are saved into Defined Event Database 210 and Event Message Database 230. Process 300 then ends.

Figure 4:
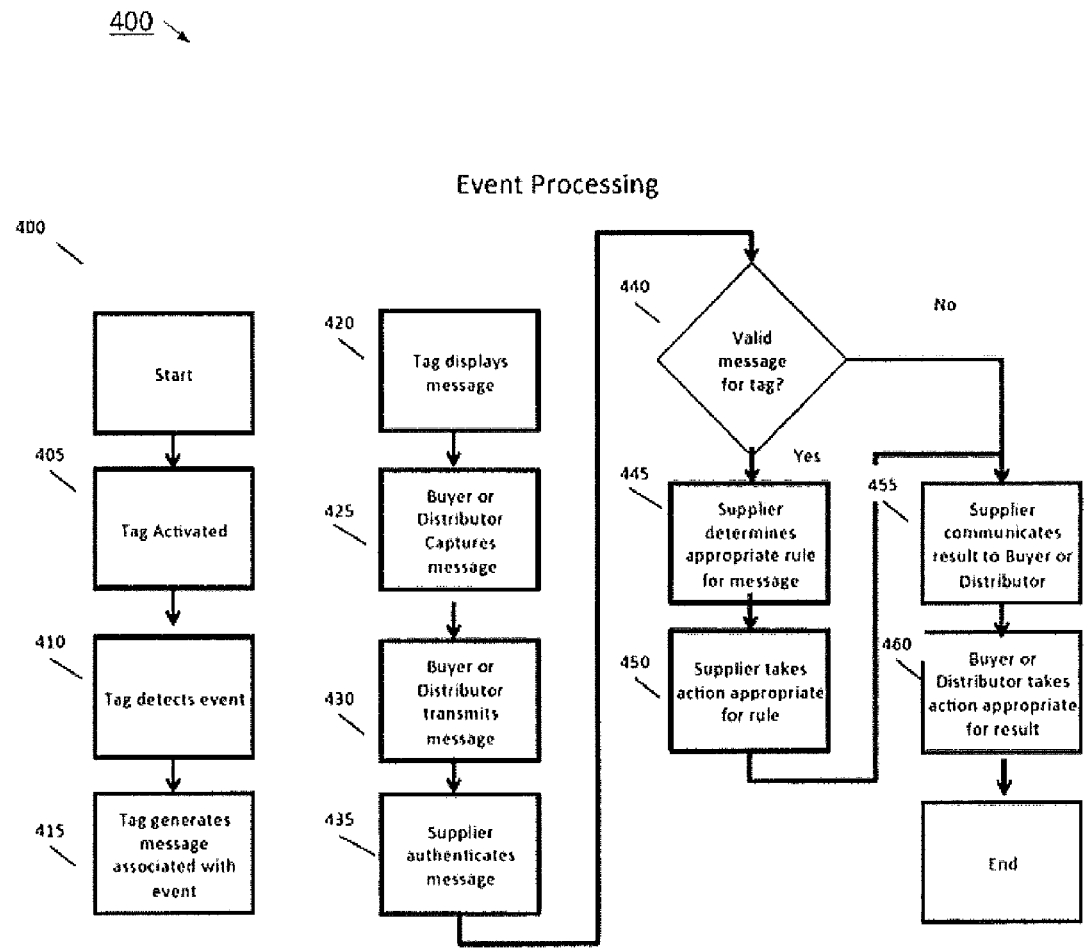
FIG. 4 is a diagram of the process for message generation in accordance with the present invention.

FIG. 4 provides an overview diagram of process 400. Process 400 begins in process step 405, where an intelligent label is activated. Activation is the point at which an intelligent label begins to monitor for events, for example by activating temperature or vibration sensors. It will be understood that a large number of different types of sensors can be used. It will also be understood that the intelligent label has a timer or clock for tracking the time. As discussed in more detail with reference to FIGS. 6, 7, and 8 below, the timer or clock in the intelligent label can track either actual time or an elapsed time. Preferably, for simplified network operation, the intelligent label will track actual time that can be associated with custody transfers and events. In process step 410 the intelligent label detects an event. The intelligent label then proceeds to process step 410 where the event message is generated by the label. This generation can be via a simple table lookup or it can be through the use of an embedded function. In some cases the event message can be encrypted to the specific good. In other cases, the event message may provide information directly usable by the reader. In process step 430 the intelligent label displays the event message. In process step 425 the buyer 102 or the distributor 103 captures the event message. This capture can be in the form of reading the event message, taking a photo of the event message or receiving the event message as part of a radio transmission (RFID) from the intelligent label. In process step 430 the buyer 102 or distributor 103 transmits the event message to EPS 100. Process 400 then continues to process step 435 where the supplier 101 or an agent of supplier 101 authenticates the event message. Authentication takes the form of looking up the event messages for this intelligent label, or transforming the received event message through a function such that can be found in the Event Message Database 230.

In process step 440, it is determined whether the event message that was received is a valid event message for this intelligent label. Since the supplier loaded the intelligent label with specific identification information, and also may maintain a registry of encryption keys regarding the message, the supplier can readily determine if a received event message has been generated by the expected intelligent label. It will be understood that the robustness and complexity of the key system may be adjusted depending upon the value of the good, risk of it being out of specification or other criteria. It will also be understood that in some cases no encryption may be necessary. Finally, it will be appreciated that encryption processes are well understood by one skilled in the art. If it is a valid authenticated event message, process 400 proceeds to process step 445. In process step 445 the supplier or supplier's agent determines from Rule Database 460 the appropriate transaction rule for this event message. Process 400 then proceeds to process step 450 where the supplier takes the appropriate action or executes the appropriate transaction based on the transaction rule determined in process step 445. Process 400 then continues to process step 455 where the supplier communicates with the buyer 102 or distributor 103 accordingly. Process 400 then continues to process step 460 where the buyer 102 or distributor 103 takes the action appropriate for the supplier's response. Process 400 then comes to an end. In process step 440, if this is not a valid message for a label, then Process 400 proceeds to process step 455 the supplier communicates this result to the buyer.

It will be appreciated that the event processing discussed with reference to FIG. 4 may be accomplished in an automated fashion using pre-defined rules. In this way, the event processing system enables a standalone, robust, trustworthy automated process for managing customer service responses. However, the event processing described with reference to FIG. 4 may also be used to support a customer service response that includes personal human contact. For example, the end-user consumer may communicate using a telephone to a customer service representative, and a customer service representative may manually accept information verbally communicated from the consumer. Also, depending on the value of the good, the risk of it being out of specification, the established relationship with the consumer or other criteria, the supplier may desire a human process to assure that the customer is managed in a positive, appropriate way.

In a particular instantiation, the system specifies methods for constructing and verifying messages to be communicated by intelligent labels such that responsible parties can be assured of the true detection of an out of specification condition and can establish business rules that presume this verification process. In this way, robust business processes can be established that have a high degree of resistance to fraud and a concomitant high degree of trust. This objective can be accomplished through methods described herein. In one instantiation, verifiable messages are constructed using cryptographic functions. FIG. 5 provides an overview of this process. Each intelligent label is assigned a secret code or key. That secret code is used as a key to a cryptographic function regarding the event message. The condition that is detected and the time that it is detected, represented as an offset from activation or as a date/time value, are encrypted in that process. Upon an event occurring, the intelligent label displays this encrypted message on its display, or alternatively communicates the message using RFID protocols to an interested party. This message is then communicated to the supplier of the good, where the message is decrypted using the appropriate secret key. One familiar with the art would recognize that this process alternatively could make use of public key cryptographic methods. The supplier then is assured that the message was not improperly represented.

In order to ensure the authenticity of an event message a variety of protocols can be used. These protocols can be varied based upon the available event message size (e.g., number of display characters on the intelligent label), the number, type an complexity of event rules, detectable conditions and the number of time units resolved. For example, a good with a distribution period of at most one year, one threshold condition to detect (i.e., temperature has exceeded the maximum range for the good), and a temporal resolution of hours, would result in 1×8 or 8,760 distinct event messages that could be transmitted. The number of digits to be transmitted can be determined by the risk associated with the good. A low value good may be presumed to have little risk of event message falsification. In this case, a code space of 8,760 may be deemed sufficient to encode these event messages. As a result, these event messages can be represented by 14 binary digits. The number of event message bits required beyond this minimum would be determined based upon the risk of event message falsification determined to exist for a given good. The probability of guessing an appropriate valid event message code can be tailored to the requirement by increasing the number of event message bits used to represent an event message.

Figure 6:
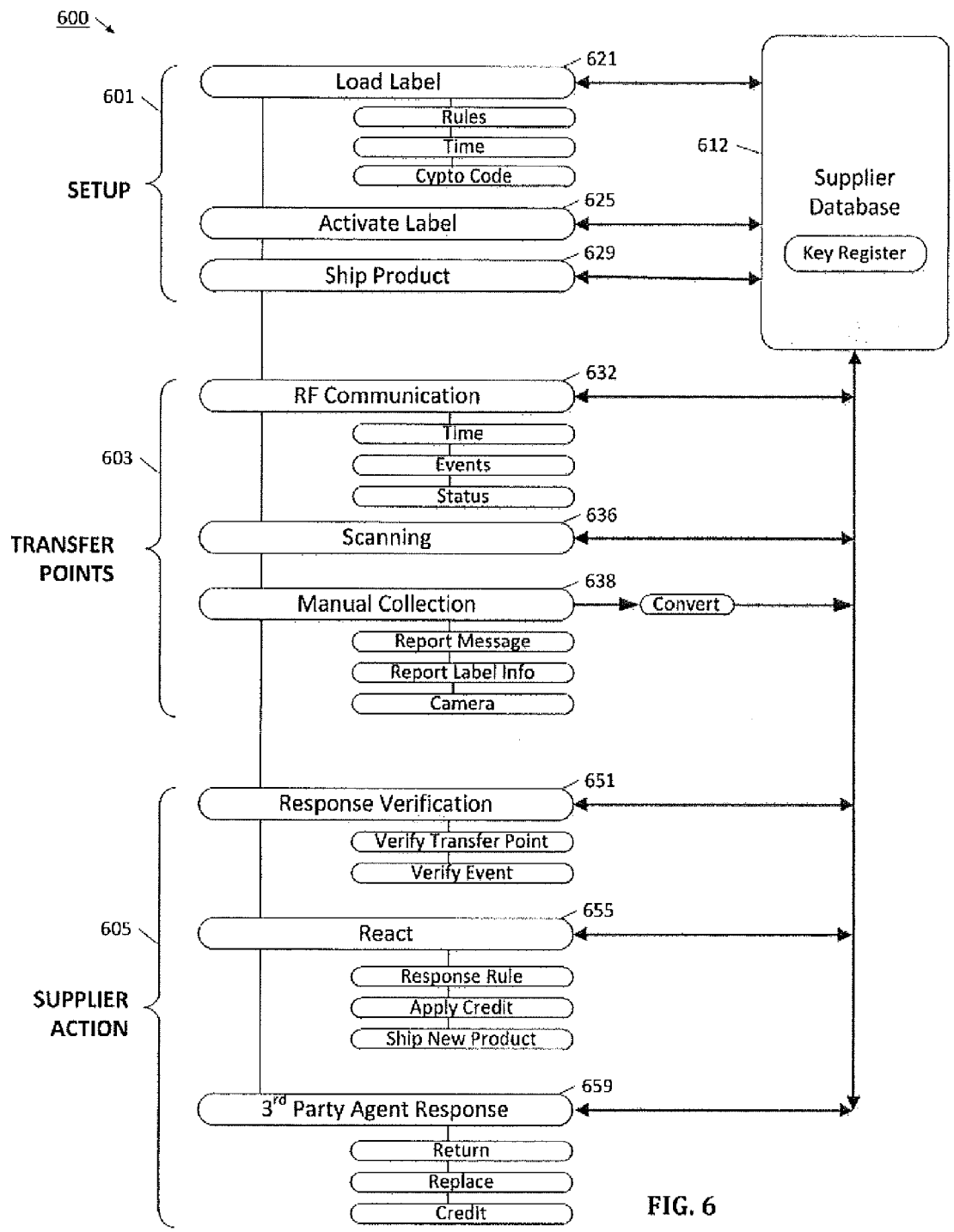
FIG. 6 is a dataflow and block diagram of a network system in accordance with the present invention.

Referring now to FIG. 6, an intelligent network processing system 600 is illustrated. Network system 600 is intended to support the use of an intelligent label system as described with reference to patent application Ser. No. 14/479,055, which is incorporated herein in its entirety. Generally, the intelligent label is attached to a good or product at the time of manufacture or shipping, and is used to track the good as it weaves its way through a chain of custody until the good reaches a final destination. The label may have a clock for providing timing information, and may further have one or more sensors for detecting the environmental conditions that the good has been subjected to. In some cases, the intelligent label also has an integrated RFID device that is useful for more robust data collection. An important aspect of network system 600 is that it enables the supplier to understand not only the condition of the good as it moves from custodian to custodian, but to determine when, where, and in whose custody the good was subjected to an unacceptable transport delay or to an out-of-bounds environmental condition. In this way, network system 600 provides the enabling system and network processes and storage for assuring trusted, robust responses to shipment and quality assessments. Although assessing condition or quality is often thought of as implying problems with a good, the present system allows new business models that can be used to positively reward a carrier, or to identify that the condition of the good as better than expected because it arrived early or was exposed to less heat than anticipated. In this way the distributor or seller could charge a premium for that good.

Network process 600, in conjunction with the intelligent label, is used to support the transfer of goods from a source to a destination in a way that assures whether the good was transferred without exceeding environmental or time limitations appropriate for that good, and to assess the quality of the good at time of delivery. For example, if someone was shipping a pharmaceutical product, the pharmaceutical product may be ineffective or even dangerous if subjected to extreme heat for more than a defined period of time. Accordingly, the intelligent label attached or integral to the pharmaceutical product would have a timer and a sensor to track both time and temperature, and therefore can report an event message that indicates an event rule has been violated. Once this event message has been reported into the system, the system may then help the supplier or a distributor assist in assuring the product is removed from the train of commerce, issue a refund, credit or return authorization, or ship a replacement product. In this way, the network processing system supports a trusted process for dealing with a discrepancy between what the buyer expected and paid for and the delivered product, and provides crucial information that can assist the supplier in understanding and correcting deficiencies in the distribution and delivery mechanisms.

It will be appreciated that network 600 may be implemented using a single network system, multiple interconnected systems, or many computers connected through a wide area network technology such as a VPN operating over a public Internet system. It will further be appreciated that certain aspects of the communication and data transfers may be done through wired or wireless devices, and the network system and processes are not to be limited to the particular embodiments disclosed. Further, it will be appreciated that the temporal aspect of the illustration may occur over a period of hours, days or weeks or other longer time. Additionally, the arrangement of the illustration does not necessarily reflect the order in which particular information will be collected, analyzed, transmitted, or acted upon.

Generally, network system 600 has three distinct purposes. First, network system 600 is used to set up and configure the overall device and label as shown in set up process 601. Second, the network system 600 supports the trusted and robust transfer of goods from source to destination by collecting information at each substantial transfer point as illustrated in section 603. In the case where a good was subjected to an environment or a transfer time that exceeds an event rule set for that good, the supplier may have to deal with rebating, returning, or replacing the good for the end user customer. Accordingly, the network process 600 provides for authenticated and trusted supplier actions and transactions 605 to resolve shipping or customer problems.

Network system 600 also has a supplier database 612 for supporting overall system operation and trust. It will be understood that the supplier database typically is implemented through a series of separate databases interconnected through a network computer system. It will also be appreciated that even though it is referred to as a supplier database, the database may be under the control of different entities within the supply chain. Accordingly, different entities within the supply chain may provide different levels of access and control into their individual databases. In this way, each individual entity within the supply chain can maintain as private its own information, but share appropriate information for assuring compliance with the rules and timing associated with a particular good.

In one aspect, the supplier database may contain a key registry. This key registry is used to support the trusted verification of an event associated with an intelligent label. For example, as described earlier, an intelligent label may have an individual key, or a key may be associated with a set of intelligent labels. The sophistication and cryptology difficulties associated with a key will typically be dependent on the value of the good, the risk of it being out of specification or other criteria. In some cases, the keys may be simple codes that can apply to a large number of intelligent labels. In other cases, a key may be part of a more sophisticated public key private key system that associates an individual good with an individual key set. It will be appreciated that a large number of security processes are well known to anyone familiar with the design and operation of a key registry.

In set up process 601, an intelligent label is first manufactured and then loaded with embedded data, which is typically data written to the integrated processor and memory, as shown in block 621. It will be understood that the intelligent label may have data loaded onto it at more than one time. The intelligent label may be preloaded with information at the time of manufacture of the intelligent label, although loading may also occur closer to the time of shipment when more is known about the particular good that is going to be shipped and its distribution path. The intelligent label may be loaded with many types of information, such as the event rules associated with the transfer of the good. These event rules may include defining the temperature extremes, temperature gradients, or temperature conditions upon which the good should remain within. The intelligent label may also include timing rules or time dependent rules as to how long the good should be in the chain of commerce. For example, some goods, such as milk, need to be sent from the manufacture to be in the hands of the end consumer within a set period of time. If that time is exceeded, then the good needs to be removed from the shelf of the store. Also, the intelligent label may be loaded with information such as keys or cryptography codes useful for verifying that event messages and other communications are coming from or derived from an authentic intelligent label. It will also be understood that the intelligent label may be loaded with other information, such as detailed information about the particular good, or even the desired transfer path for that particular good.

Although a separate intelligent label is contemplated in illustration 600, it will also be up appreciated that the functions of the intelligent label may be integrated into the good itself. When the good is ready to be shipped, the intelligent label is activated as shown in a block 625. In activating the intelligent label, the circuitry integrated in the intelligent label is activated, often to establish a timing reference or enable a sensor to begin monitoring an environmental condition. In one example, the timing reference may be an absolute time, or in other cases maybe set to count an elapsed time. The activation of the intelligent label may be done through a physical process, such as removing the intelligent label from a roll of labels, by removing the backing from the intelligent label which triggers onboard electronic functions as described in patent application Ser. No. 14/479,055, or may be done through an electronic process, such as a communication with an RF source through an RFID communication device. Promptly after the intelligent label has been activated, the good will be shipped as shown in block 629.

It will be understood that the individual electrical functions in an intelligent label such as a timer or clock, sensors, and logic may be activated at different times depending on application specific needs. In one example, a timer may be activated) when the label is activated—and would advantageously be correlated with the elapse time to events and event messages. Alternatively, the intelligent label may have a clock that maintains the date and time the good was first shipped. In many cases, it is desirable to maintain the date and time clock in the intelligent label, even though doing so may use some additional power and use a more accurate oscillator (and a crystal) as compared to an elapse timer. For example, using an elapse timer may result in an uncompensated or unknown time period between when the intelligent label (and hence the elapse timer) is activated and when the good is first shipped, which would introduce uncertainty as to which party had custody of the good when an event occurred and the event message was displayed on the intelligent label. Indeed, even a modest uncertainty, say 4 hours, may be significant in determining who had custody when a good was subject to excessive heat. In a specific example, if a good was reported as having been exposed to excessive heat, even a few hours of uncertainty might make it impossible to know if the good went bad in the delivery truck, or on the consumer's porch. Such uncertainty can be avoided by integrating a time and date clock in the intelligent label.

With the network system, the supplier knows when the good was delivered via the shipper reporting the information directly to them, typically relying on a bar code printed on the surface of the label that uniquely identifies the good. The supplier also knows when the consumer reported the problem, but the time of reporting has little if any bearing on when the event occurred as to that good. Advantageously, the label may generate an event message comprising a code which can be used by the supplier to determine when and in who's custody the event actually occurred. Reporting the absolute time (verses an elapsed time) that an event occurs provides more useful information to the supplier, but may require more sophisticated label electronics. With an absolute clock, the timer on the intelligent label is often active and running from the time the label is manufactured. In this way, activating the label at time of shipping only activates the other electronic functions on the label such as data logger, sensors, conditional logic. The time the label was activated can be recorded but it isn't required to synchronize the event and alarm with the shipper information. Instead, synchronization of shipping events is done by recording and storing in the label electronics the absolute time an event occurred—and providing a sufficient event message on the face of the label to enable the consumer to relay the time data back to the supplier. The absolute reference (known date/time) can be written to the label at either the manufacturer or by the supplier (e.g. via RFID) or any other time or trusted location prior to shipment. Once an absolute reference is written to the intelligent label the clock in the label continues to keep time. Using an absolute timer often increases need for timing accuracy (which requires a crystal oscillator) and additional power. It will be appreciated that in some cases, the elapse timer will provide sufficient timing information to support a supplier's reporting needs. It will also be appreciated that if the absolute time is known when the elapse timer is started, then the elapse time can be correlated back to an actual time using the network services.

After the intelligent label is activated and the time of shipping recorded, the good is placed into the shipping process, often times using a carrier such as the US mail, Federal Express, UPS, or other such carrier. In other cases, a good may be carried by several different entities. For example, one trucking company may carry a good from the manufacturer to a central depot, and then another trucking company will take the good to a train station. The good will then travel by train to another area of the country, where it can be transferred to one or more trucking companies before finally reaching its end destination. Accordingly, a good may take alternative paths as it goes from the supplier to its final end destination.

Preferably, each time the good changes custody, or even changes possession within a single carrier, information about the transfer (particularly that relating to the good involved, the time and location of each transfer, and the new custodians) will be collected and transmitted to the supplier. If the intelligent label is equipped with an RFID (e.g. EPC Gen2 or NFC) or equivalent interface (e.g. Bluetooth, ZigBee etc.) and a compatible RF communication device (e.g. EPC RFID reader or NFC equipped mobile phone) is available at the transfer point, some of the information may be collected electronically from the intelligent label itself as shown in block 632. The information wirelessly retrieved from the intelligent label together with associated shipping information can then be transmitted to the supplier. If an RF communication is possible, transfer and other supply chain information can also be written to the intelligent label for later access. In some cases, however, the transfer point may not have an RF communication device. In such a case a barcode scanner may be used to read information from the intelligent label. For example, barcode or other machine readable printed information specific to that good, the buyer or ultimate destination point may be on the label where it can be scanned or read and transmitted to the supplier database for further use. Information on the intelligent label may also be in human readable form that can be read and combined with associate information shipping information and transmitted to the supplier. It will be appreciated that these methods may be used singularly or in combination to provide the supplier or supply chain with information (especially the identify of each of the good's custodians and the date/times they had custody—the transfer history) required to confidently effect transaction rules, It will be appreciated that the transfer histories and associated shipping information of goods that shippers and distributors provide to suppliers is generally deemed reliable in part because it is effectively confirmed by the predecessor and successor custodians—except in the case of the last transfer which is typically to the buyer (or end user) which may be a business or large organization, a small entity or an individual. The supplier may know the date/time of the final transfer/delivery from information received from the last custodian in the distribution chain, but the supplier cannot rely upon the buyer (or end user) to accurately report if an event occurred and what it was (it could be one of many typical for the delivered good), who had custody when the event occurred, and how long did the custodian have it before the event occurred. The event may have occurred prior to the final transfer to the buyer, or hours, days or even weeks afterwards which might limit or even eliminate any obligation on the part of the supplier. And despite a buyer's claim to the contrary, the event may not have happened at all. To execute an appropriate action or transaction the supplier needs verifiable information from the intelligent label—the event message(s). An event message is typically displayed automatically upon the occurrence of an event. In some cases however, an event message, part thereof, may be displayed only upon receiving a subsequent authorization code (e.g. via an RFID reader/NFC enabled mobile phone). The event message displayed on the intelligent label can be transmitted to the supplier via the best option available: orally via a phone call (to a live person or automated voice response system), by sending a picture of event message, via a mobile app or web service. If the buyer is equipped to do so, the buyer may be able to wirelessly access at least some, if not all of the information contained in the event message via an RF communication device (e.g. an RFID reader or NFC enabled mobile phone) and transmit it to the supplier. The wirelessly accessed information may be combined with human readable information on the intelligent label to complete the event message and transmit it to the supplier. As discussed elsewhere in this document, the event message may contain both preprinted information as well as that either visually displayed using an electro-optic display or stored in electronic memory within the intelligent label. Also as discussed elsewhere in this document, a variety of techniques appropriate to the good and specific circumstances of the situation to ensure that the information is secure and verifiable (e.g. encrypt the data)

The intelligent label provides human readable event messages that may be used to authenticate the label and verify an event. For example, if a consumer receives a good and the intelligent label to which it is attached has a red dot (a component of the event message) indicating that an event has occurred as defined by previously set event rules which in turn indicates that good is spoiled, the consumer may be instructed by the intelligent label to call a support line and send a picture of the intelligent label (which includes the complete event message). In this way, the supplier database would have the information to show the particular information written on the label, a verification that the message indicator had been set on the label, and in some cases an alphanumeric code that can be used to verify the authenticity of the label. In this way, the supplier of the good will have substantial information as to the condition of the good at the time the event occurred. Independent of when they receive the event message. Further, since the transfer history and associated shipping information has been collected on that good throughout the entire chain of custody, the supplier will have the ability to identify where in the supply chain the event occurred that caused the good to spoil.

When something has gone wrong in the delivery process and the intelligent label has a visual alarm indicia showing the good has been exposed to a condition outside the rules for that good, then the supplier needs to take action regarding that good. Important in this process is that the supplier trust that the consumer has not been gaming the system in order to gain an undeserved economic gain (e.g. credit or refund, free replacement product) or relief from liability. Response verification 651 therefore becomes important in assuring that the supplier appropriately responded to the customer. Since the supplier has transfer history (from the distribution chain), as well as the event message (from the end user consumer), the supplier is able optimally respond to the situation—especially if they can accurately determine when the event occurred (relative to the transfer history), the change in the conditions that caused the event to occur. This increases the integrity of the system and thus the immediacy with which issues are resolved while reducing costs. And it gives suppliers and the distribution chain the tools needed to avoid or at least minimize the impact of future recurrences As shown in block 655, the supplier then needs to react to their having a bad product in the hands of the consumer or in the chain of commerce. It will be appreciated that although the focus of this discussion has been with an end-user, the indication of a problem with the good may occur at other times within the chain of commerce. For example, a grocery store may receive a shipment of milk, and notice that several of the containers have red dots at the time the truck arrived at their warehouse. In such a case, the supplier would need to arrange for credit or return with the grocery store, and not the end user customer.

Depending upon the type and cost of the good, the supplier may react in different ways. For example, sometimes the supplier may just ask the to throw the good away and the supplier will ship a new good to the buyer. In another case, the good, even though it has been shown to be exposed to some extreme condition may still have some, although reduced value to the buyer. In this case the supplier may apply a full or partial payment credit to the buyer. An example may be a bottle of wine that was shipped but exposed to a high temperature for too long of a period. Although the wine may now not be in an excellent state, it would still be drinkable and enjoyable by the consumer. In such a manner the supplier may not refund the entire cost of the bottle of wine, but may give a discount on the next bottle of wine the consumer purchases. In some cases, however, it would be important that the good be returned, and therefore the supplier will need to take a more active role in getting the good out of the consumer's hand.

One way to do so is to have an arrangement with a third party agent in the locality of the end-user consumer. For example, a pharmaceutical company may ship its drugs directly from the manufacturer to an end-user. If the end user receives a drug that has been exposed to heat too long, or have expired by the time they reached the consumer, it is very important that those drugs be taken out of the consumer's hand, and destroyed or returned to the manufacturer. Further, there may be a significant health factor in assuring that the customer receives a good replacement prescription immediately. In such a case, the pharmaceutical manufacturer may have pre-existing arrangements with a third-party, such as a nationwide bricks-and-mortar drug chain, that can act as its agent to accept return the bad medicine, and do an immediate replacement for the customer. In such a case, this third-party agent as shown in block 659 may accept return of the bad goods and replace them with good goods or immediately apply a credit to that customer. Such a third-party would need at least some limited access in to the supplier database for communicating information back to the supplier and to receive appropriate instructions and authorization and compensation.

Figure 7:
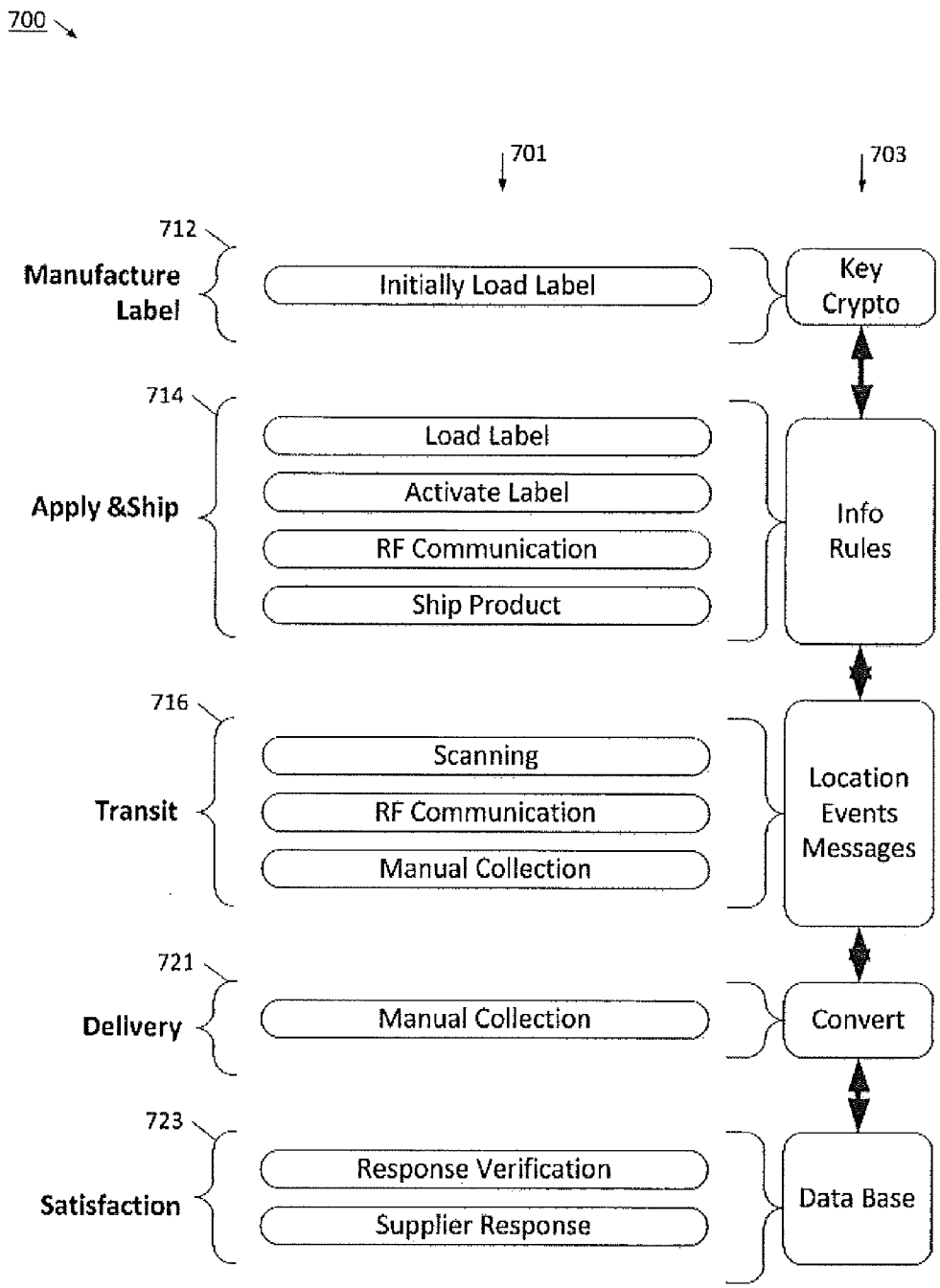
FIG. 7 is a dataflow and block diagram of a network system in accordance with the present invention.

Referring now to FIG. 7, another network process in accordance with the present invention is illustrated. Network process 700 is a simplified version of process 600 described with reference to FIG. 6. Network process 700 has an intelligent label that has an area for displaying a message using a hi-stable, and preferably permanent and irreversible electric chromatic material. This message may advantageously display information regarding the condition of the product, such as whether the intelligent label and the good to which its attached have been subjected to any environmental conditions that exceed the event rules for that particular good. In this way, the human readable indicia is provided on the intelligent label that enables someone without sophisticated RF or scanning capabilities to determine whether or not the good has been subjected to an out-of-specification event, which is an indicator of the quality of a good. Also, the intelligent label may have communication devices such as an RFID radio and memory integrally formed. In this way the label may provide additional information for those having the more sophisticated the devices.

Generally, network process 700 has a series of steps 701 that are performed during the process of getting the intelligent label and good from a manufacturer to an end-user. Throughout this process 701, information may be collected and stored as illustrated in area 703. Importantly, information is gathered and recorded at manufacture, during transit, and at the time of product delivery. The network is used to collect, analyze, and scrutinize the data to determine the veracity of an claim that a good was delivered in a degraded state, and provide trusted data to accurately identify when an event occurred, and who had custody of the good when it did, and how long they had custody of the good before the event occurred. Accordingly, it may be confidently determined who was responsible for causing the good to be unacceptably delayed or exposed to extreme environmental conditions. In this way, a supplier or manufacturer has a greater degree of confidence that complaints against its good due to changes in its condition during transport are valid and identify areas in its distribution chain that need to be corrected.

An intelligent label may be manufactured as shown in area 712. This label may be formed as a separate label, integral to a shipping package, or may even be internally formed to the good or the good's packaging. In some cases, depending upon the value of the good, codes or cryptographic information may be loaded into the label. In this way, later communications with the label may be verified to a higher degree of authenticity.

Near the time when the good is ready to ship as shown in area 714, additional information may be loaded onto intelligent label. This may include printed information on the face of the label such as barcode and address information, and may include information that is transmitted into the label through an RFID communication process. In this way, the label provides not only human readable information, but can provide additional information for those having the more sophisticated RFID communication devices.

At the time the good is ready to ship, the intelligent label is activated, that is, the circuitry and sensors are initiated with in the intelligent label. This can be done for example by an RF communication, or may be done by some physical act that completes or breaks a circuit within the intelligent label. The good is then placed into the chain of commerce by shipping the good, and the time of the shipping is collected by the network. Throughout the distribution process additional information about the good and intelligent label are collected and stored in local or shareable databases. In this way, at various points throughout the chain of commerce, those that have need to understand the history of the intelligent label and product are able to access and use that information.

During transit, as shown in area 716, the intelligent label may be interrogated for information stored in the label at various locations and points in time. Depending upon the sophistication of the person possessing the good and intelligent label, the information may be collected using RFID communication, through the use of an optical scanner such as a barcode scanner, or by simply looking at the label and seeing if the label's electro-optical indicia shows that an event has occurred and hence the product is good or bad. Again, this information is collected and stored for shared use in the databases.

The good is finally delivered to its end destination as shown in area 721. Oftentimes, this end location will be a consumer that has no ability to interact with the RFID or other wireless communication devices within the label. It will be understood that RFID is starting to become more common for household use, but will not be prevalent for many years. Accordingly, the consumer is limited to looking at the intelligent label and seeing if the electro-optical indicia shows the good as being good or bad. If the product is bad, the consumer may be instructed by printed information on the intelligent label to contact the manufacturer. In some cases, the consumer can benefit by taking a picture of the intelligent label and sending it to the supplier. In either case, the information from the message area of the intelligent label or from the camera will need to be converted and put in to the database of information.

Often, the intelligent label will have an alarm message area that shows a code, symbol, or characters that have been set by the label circuitry upon the occurrence of an event. The alarm message may vary in length from a character or two, to a longer code depending on the value of the good and application specific needs. The code may provide, for example, a message that has been encrypted and displayed to give more information about the alarm event. When the consumer reports this event, for example by phone, computer, or taking a picture and sending it to the supplier, the supplier can decrypt the code and verify that the message is from a valid intelligent label, and further gain more insight as to the timing, severity, and custody issues regarding the alarm event. It will be understood that the code indicia may be used to display a wide variety of encrypted or unencrypted messages.

With this information gathered from start to finish of the chain of commerce, the supplier has substantial information on which to base its decision of how to react to a customer complaint. In some cases, the supplier may find that the consumer has exaggerated or falsified a report of a bad product, or has intentionally manipulated a label. In other cases, the supplier may verify that the good expired or was exposed to extreme conditions in areas outside the consumer's control. In these cases, the supplier can give a reasonable response to satisfy the customer's concerns. In this regard, the supplier may immediately ship out a new good, may provide a credit, or may instructed the consumer to take local action, such as going to a local pharmacy, to resolve the problem.

Figure 8:
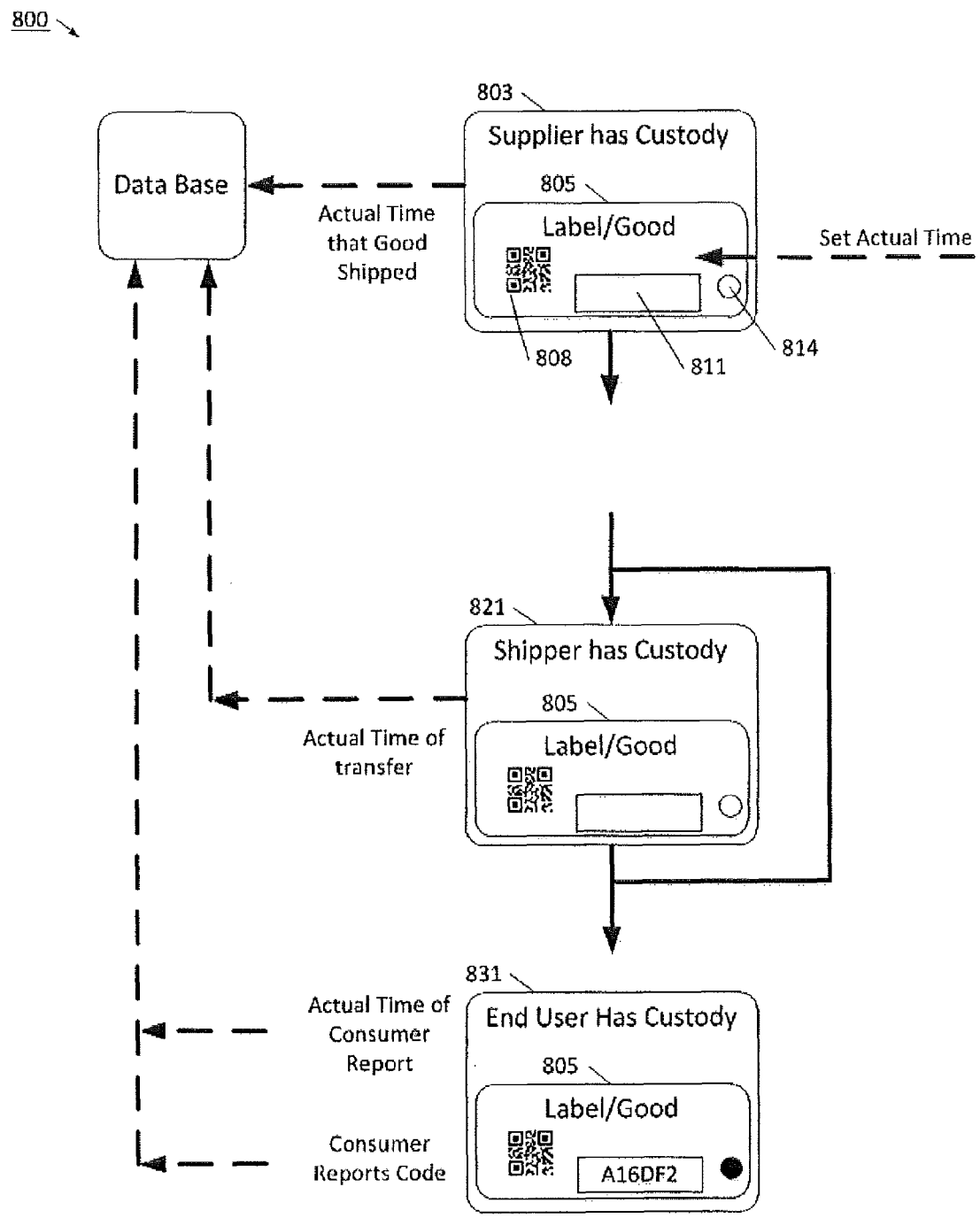
FIG. 8 is a dataflow and block diagram of a network system in accordance with the present invention.

Referring now to FIG. 8, another embodiment of the network system for use with an intelligent label is illustrated. Network system 800 is similar to network systems 600 and 700 described earlier, however network system 800 concentrates on the timing and synchronization useful for the network. In network system 800, a supplier 803 initially has custody of the good or product. During the process of introducing the product into the chain of commerce, a label 805 is applied to the product. This label may be an external label that is attached to the product, may be integrally formed on the packaging of the product, or may even be on the product itself. Although the label 805 may take many forms, typically it will have an area that has an address and printed information (not shown), a barcode information area 808, a quality indicator 814, and an area for an alarm message 811. As previously discussed, the label contains electronic circuitry and a power source that upon out-of-tolerance timing or environmental conditions is able to change the color or transparency of quality indicator 814. In this way, if an unacceptable delay has been introduced into the distribution process, or the product was subjected to an extreme environmental condition such as heat or vibration, then a readily visible indicia is activated in the quality indicator area 814. Further, additional specific information regarding the timing and type of alarm condition may be displayed in alarm message area 811. This message area can contain symbols, characters, or other messages that provide more detail as to the alarm event. In some cases the alarm code may be specifically encrypted for this particular good which can be used later for verification and authentication purposes.

Sometime during the manufacturing process, the supplier sets an actual time into the electronic circuitry embedded in the label. Typically, the actual time will be set using an RFID communication device. The actual time may include the date as well as time. The resolution required for the time will be dependent upon application specific needs. For example, the distribution and shelf life of some goods may be measured in weeks, whereas others may have a useful life measurable in months or longer. Although a network system may use an elapsed time counter, it will be appreciated that the use of elapsed time may require additional infrastructure investments in the network. Further, using an elapsed time system could be susceptible to tampering by custodians within the distribution chain. Therefore, even though using an intelligent label with circuitry capable of reporting actual time requires more power and a higher accuracy clock in the intelligent label, the overall benefit to the supplier may justify the additional complexity in the intelligent label.

At the time the supplier moves the good to the first custodian in the distribution chain (typically the initial shipper), the actual time is captured and stored in the supplier's database. When the shipper obtains custody as shown in block 821 it will also capture the actual time of the transfer and preferably transfer that information into the supplier's database. Often, there will be multiple shippers that have custody of the good as it moves from the supplier to the end-user. At each point of transfer, the actual time is preferably captured and stored into the supplier database. It will be understood that this transfer of time information may be done using an RFID communication device to retrieve the actual time from the intelligent label itself, or may be derived from the time the shipper scans the barcode on the intelligent label.

As shown in block 831, the shipper will deliver the good to the end-user. Again, the shipper may have an RFID or optical scanning device that is able to communicate actual time information back to the supplier database. The end-user now has custody of the good. At some point the end-user may examine the label 805 and see that the quality indicator 814 is showing that the good is bad. Generally, there will be some printed message on the label that instructs the consumer to call or go online to report the defective product. Although in some instances the consumer may have a device for directly reading the RFID information from the label, it is more likely that the consumer will use a telephone or Internet connection for reporting defect information to the supplier. For example, the consumer may call the supplier and report that the intelligent label has its quality indicator showing a defective condition. The supplier then can also capture the actual time that the consumer has made the complaint regarding the good. However, it will be understood that the time of consumer reporting is not likely correlated to the time the good was actually exposed to the out-of-specification event. For example, a product may have gone bad in the delivery truck, but the consumer waited several days before inspecting the package to report the problem. In order to determine who had custody when the event occurred, the supplier may ask the consumer to read additional information from the label. That information can include shipping information or specific printed codes that identify the good. In some cases, the alarm message area 811 may also have an electro-optical code activated that has further detail as to the timing any type of the out-of-specification event. In some cases the consumer may just read the information to a human operator, and in other cases the consumer may report the product and alarm information by simply taking a picture of the label or entering it into a mobile application or web service.

Oftentimes, the alarm message may be encrypted with a key specific to that particular good. In this way, having both the alarm message and printed information from the label (collectively the event message), the supplier is able to verify that an authentic intelligent label is being used to report the good has been subjected to an out-of-specification event. Further, the supplier may decrypt the alarm message to learn more about the timing and environmental event that caused the alarm condition.

Accordingly, the supplier has a database of actual time information that accurately represents the time that each party had custody of the good and when the event occurred. In this way, the supplier is able to verify which party had custody when the good was exposed to an out-of-specification event. Trustworthy and verifiable data regarding custody and quality are essential to a supplier being able to first properly respond to the consumer claims, and second to implement procedures to improve their distribution chain to avoid future deliveries of bad goods.

In one example of network system 800, a pharmaceutical supplier ships a pharmaceutical package to a consumer. At the time the product leaves the pharmaceutical company and is handed off to the shipper, both the pharmaceutical company and the shipping company report the actual time to the supplier database. Then, each time the pharmaceutical product changes custody within the shipping process, the shippers also report that actual time back to supplier database. Finally, the shipper delivers the pharmaceutical package to the end-user, for example by placing the package on the consumer's front porch. Again, the shipper typically will have a mechanism to electronically transmit the actual time of the drop off to the supplier database. Importantly, as the product has moved through the distribution chain, the intelligent label has been monitoring the actual time and environmental conditions. Significant changes have been recorded in the label's memory, and are therefore available for use to evaluate if the product is still effective.

Continuing this example, the consumer may retrieve the product from their front porch, and notice that the electro-chromic event indicator is showing that the pharmaceutical product has likely spoiled. The consumer may read from the label that they are instructed to call a particular toll-free number for further instructions regarding the defect. The consumer calls the number and reports the product as having its event indicator activated. At this point, the pharmaceutical supplier does not know if the product became exposed to the out-of-specification event at some point during the shipping process, at a point after delivery to the customer, or even if the customer is telling the truth about the product. However, the supplier may continue to retrieve additional information from the customer, including product identification information printed on the label, as well as any electro-chromic code showing in the alarm message area. With this information, the supplier is able to first verify that the product has actually been exposed to an out-of-specification event, and second can determine with a high degree of confidence who had custody when that event occurred.

Here, for example, the final shipper may have delivered the product timely and properly, but the consumer let the package sit on the front porch in the sunlight for several days. In knowing the actual time period that each party had custody, and deriving from the label code the actual time the product was exposed to the excessive heat, the supplier knows with great confidence that the product was exposed after a significant time on the end-user's front porch. By understanding that the consumer was primarily at fault for allowing the product to be exposed to the excessive heat, the pharmaceutical supplier can more appropriately set its response to the consumer complaint. For example, the customer service agent may be able to confidently convince the end-user that they were responsible for the spoilage, and therefore negotiate for giving only a partial credit for the shipment. In another result, the supplier may determine that there is a better delivery location for future shipments to this end user. In this way, network system 800 has enabled a more robust, more trustworthy, and more accurate consumer response system. Such a system can provide valuable information to the supplier in how to improve its delivery processes, as well as support superior customer relations.

While particular preferred and alternative embodiments of the present intention have been disclosed, it will be appreciated that many various modifications and extensions of the above described technology may be implemented using the teaching of this invention. All such modifications and extensions are intended to be included within the true spirit and scope of the appended claims.

What is claimed is:

1. A method for distributing a product through a distribution path that has multiple parties, comprising:
    associating the product with an intelligent label, the intelligent label having a bi-stable visual indicator that is set responsive to a monitored condition;
    initiating in the intelligent label a clock that can be related to the time the product was shipped;
    collecting time data from the clock from time to time as the product is moved through the distribution path;
    receiving an event message presented by the indicator on the label, the event message generated responsive to an event; and
    determining a time that the event message was generated.

2. The method according to claim 1, further comprising determining which party had custody of the product at the time the event occurred.

3. The method according to claim 1, concurrent with receiving the event message, further receiving information that is printed on the label.

4. The method according to claim 3, wherein the printed portion is machine readable.

5. The method according to claim 1, wherein the intelligent label is attached to the product.

6. The method according to claim 1, wherein the intelligent label is integrated into the product or its packaging.

7. The method according to claim 1, wherein the hi-stable visual indicator is constructed to be irreversible and permanent.

8. The method according to claim 1, wherein the bi-stable visual indicator is a multi-character code.

9. The method according to claim 1, wherein the clock is a real-time clock.

10. The method according to claim 1, wherein the clock is an elapse timer.

11. The method according to claim 1, wherein collecting the time data further comprises interrogating an RFID device in the intelligent label.

12. The method according to claim 1, wherein the monitored condition comprises an environmental condition.

13. The method according to claim 1, wherein the monitored condition comprises a passage of time.

14. A method for distributing a product through a distribution path, comprising:
    loading an intelligent label with rules and a cryptology code;
    associating the product with the intelligent label, the intelligent label having a visual indicator that is set according to the rules;
    initiating in the intelligent label a clock that can be related to the time the product was shipped;
    initiating in the intelligent label a sensor that can monitor an environmental condition;
    collecting data from the intelligent label from time to time as the product is moved through the distribution path;
    receiving an event messages presented by the indicator on the label, the event message generated responsive to evaluating the rules; and
    determining a time that the event message was generated.

15. The method according to claim 14, further including the step of determining which party had custody of the product at the time the event occurred.

16. The method according to claim 14, wherein the event message is generated from a rule setting time thresholds.

17. The method according to claim 14, wherein the event message is generated from a rule setting environmental thresholds.

18. The method according to claim 14, wherein the environmental condition is temperature, humidity, vibration, or shock.

19. The method according to claim 14, wherein the visual indicator comprises a bi-stable electro-optical material.

20. The method according to claim 14, wherein the visual indicator comprises a permanent and irreversible electro-optical material.

* * * * *